(12) United States Patent
    Banwart

(10) Patent No.: US 10,787,184 B2
(45) Date of Patent: Sep. 29, 2020

(54) INTERMODAL TRANSPORTATION SYSTEM INCLUDING GUIDE RAILS AND AUTONOMOUS TRANSPORT DOLLIES

(71) Applicant: Twenty-First Century Transport Systems, Inc., Fort Scott, KS (US)

(72) Inventor: Donald D. Banwart, Fort Scott, KS (US)

(73) Assignee: Twenty-First Century Transportation Systems, Inc,., Fort Scott, KS (US)

(*) Notice: Subject to any disclaimer, the term of this patent is extended or adjusted under 35 U.S.C. 154(b) by 269 days.

(21) Appl. No.: 15/947,000

(22) Filed: Apr. 6, 2018

(65) Prior Publication Data

US 2018/0297615 A1    Oct. 18, 2018

Related U.S. Application Data

(60) Provisional application No. 62/559,350, filed on Sep. 15, 2017, provisional application No. 62/482,265, filed on Apr. 6, 2017.

(51) Int. Cl.
    | | |
    |---|---|
    | *B61D 47/00* | (2006.01) |
    | *B62D 53/08* | (2006.01) |
    | *B61D 45/00* | (2006.01) |
    | *B62D 51/04* | (2006.01) |
    | *B62D 49/00* | (2006.01) |

(52) U.S. Cl.
    CPC ......... *B61D 47/005* (2013.01); *B61D 45/004* (2013.01); *B62D 53/0864* (2013.01); *B62D 49/007* (2013.01); *B62D 51/04* (2013.01)

(58) Field of Classification Search
    CPC ....... B61D 47/00; B61D 47/005; B61L 17/00; B61B 1/00; B61B 1/005; B61F 9/00; B61F 11/00; B60F 1/00
    See application file for complete search history.

(56) References Cited

U.S. PATENT DOCUMENTS

| | | |
|---|---|---|
| 2,044,767 A | 6/1936 | Besler |
| 3,019,917 A | 2/1962 | Ajero |
| 3,153,489 A | 10/1964 | Leavengood et al. |
| 3,169,012 A | 2/1965 | Fagan |
| 3,246,912 A | 4/1966 | Cunha |
| 3,448,693 A | 6/1969 | Graham |

(Continued)

FOREIGN PATENT DOCUMENTS

| | | |
|---|---|---|
| CA | 1098929 | 4/1981 |
| WO | 2008131427 | 10/2008 |

OTHER PUBLICATIONS

"International Search Report and Written Opinion", PCT/US2014/056127, dated Dec. 30, 2014, pp. 1-8.

(Continued)

*Primary Examiner* — Robert J McCarry, Jr.
(74) *Attorney, Agent, or Firm* — Law Office of Mark Brown, LLC; Christopher M. DeBacker; Mark E. Brown

(57) ABSTRACT

An intermodal transportation system is provided having interconnected railcars adapted for transporting interconnected freight trailers where the freight trailers remain connected while being transported on the railcars. Individual trailers are dropped off at a railyard by over-the-road tractors and are then transported onto the railcars using various means as makes sense due to weather, location, and other factors.

6 Claims, 20 Drawing Sheets

(56) References Cited

U.S. PATENT DOCUMENTS

| | | | |
|---|---|---|---|
| 3,578,096 A | 5/1971 | Pearson | |
| 3,717,363 A | 2/1973 | Berends | |
| 3,764,164 A | 10/1973 | Lankenau et al. | |
| 3,827,723 A | 8/1974 | Neff et al. | |
| 3,995,876 A | 12/1976 | Ronne | |
| 4,111,451 A | 9/1978 | Pinto | |
| 4,179,997 A | 12/1979 | Kirwan | |
| 4,365,820 A | 12/1982 | Rush | |
| 4,375,343 A | 3/1983 | Butler | |
| 4,385,857 A | 5/1983 | Willetts | |
| 4,413,836 A | 11/1983 | Losh | |
| 4,416,571 A | 11/1983 | Krause | |
| 4,451,058 A | 5/1984 | Curry | |
| 4,480,554 A | 11/1984 | Brodeur et al. | |
| 4,526,395 A | 7/1985 | Arguin | |
| 4,669,391 A | 6/1987 | Wicks et al. | |
| 4,685,399 A | 8/1987 | Baker | |
| 4,778,193 A | 10/1988 | Torcomian | |
| 4,841,872 A | 6/1989 | Wicks et al. | |
| 4,922,832 A | 5/1990 | Lienard et al. | |
| 4,955,144 A | 9/1990 | Lienard et al. | |
| 4,989,518 A | 2/1991 | Kealey et al. | |
| 5,017,064 A | 5/1991 | Kirwan et al. | |
| 5,020,445 A | 6/1991 | Adams | |
| 5,098,115 A | 3/1992 | Haire et al. | |
| 5,129,327 A | 7/1992 | Snead | |
| 5,172,819 A | 12/1992 | Daugherety, Jr. et al. | |
| 5,246,081 A * | 9/1993 | Engle | B61D 47/005 |
| | | | 180/168 |
| 5,407,221 A | 4/1995 | Haire et al. | |
| 5,407,309 A | 4/1995 | Hesch et al. | |
| 5,540,157 A | 7/1996 | Andersson et al. | |
| 5,601,030 A | 2/1997 | Brouillette | |
| 5,607,279 A * | 3/1997 | Hill | B60P 3/122 |
| | | | 414/478 |
| 6,056,309 A | 5/2000 | Brown | |
| 6,123,029 A | 9/2000 | Mobley | |
| 6,460,468 B1 | 10/2002 | Mobley | |
| 6,540,246 B2 | 4/2003 | Andersen et al. | |
| 6,599,082 B2 | 7/2003 | Lawrence | |
| 6,718,886 B2 | 4/2004 | Engle | |
| 6,736,071 B2 | 5/2004 | Engle | |
| 7,040,425 B2 | 5/2006 | Hammonds | |
| 7,093,682 B2 | 8/2006 | Cooper | |
| 7,175,134 B2 | 2/2007 | Hsu et al. | |
| 7,255,047 B1 | 8/2007 | Croslovi et al. | |
| 7,934,743 B1 | 5/2011 | Wall et al. | |
| 8,534,694 B2 | 9/2013 | Banwart | |
| 2002/0056579 A1 | 5/2002 | Cooper | |
| 2006/0070774 A1* | 4/2006 | Hammonds | B60D 1/36 |
| | | | 180/6.2 |
| 2007/0040353 A1 | 2/2007 | Dallaire et al. | |
| 2009/0060695 A1 | 3/2009 | Camaly | |
| 2009/0205882 A1 | 8/2009 | Smith et al. | |
| 2011/0072999 A1* | 3/2011 | Banwart | B61D 3/184 |
| | | | 104/26.1 |
| 2011/0074132 A1 | 3/2011 | Banwart | |
| 2014/0045223 A1 | 1/2014 | Banwart | |

OTHER PUBLICATIONS

"Motor Vehicles (Standards) Regulations—Sect 24: Converter dollies used in road trains", Northern Territory Consolidated Regulations www.austlii.edu.au/au/legis/nt/consol_reg/mvr372/s24/hmtl retrieved Sep. 9, 2009, 1 of 1.

"PCT Search Report & Written Opinion", PCT/US10/50995, dated Dec. 1, 2010.

"PowerPusher: "If It Rolls . . . We Can Move It."", www.powerpusher.com/The_Power_Pusher.htm referenced 9/60/2009.

\* cited by examiner

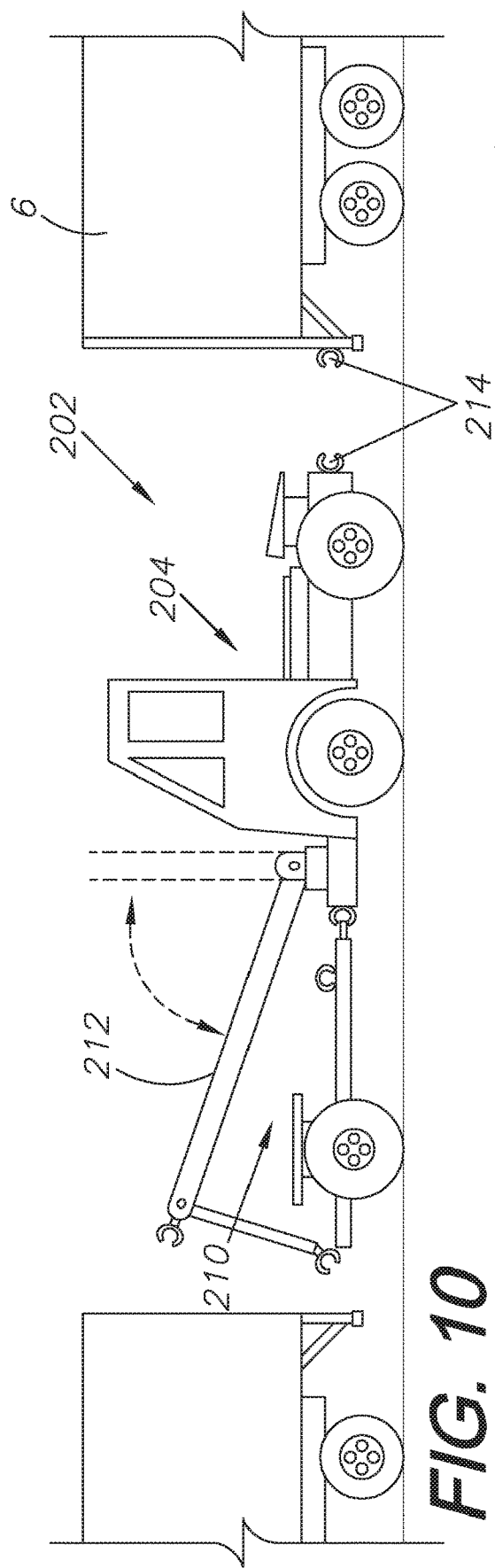
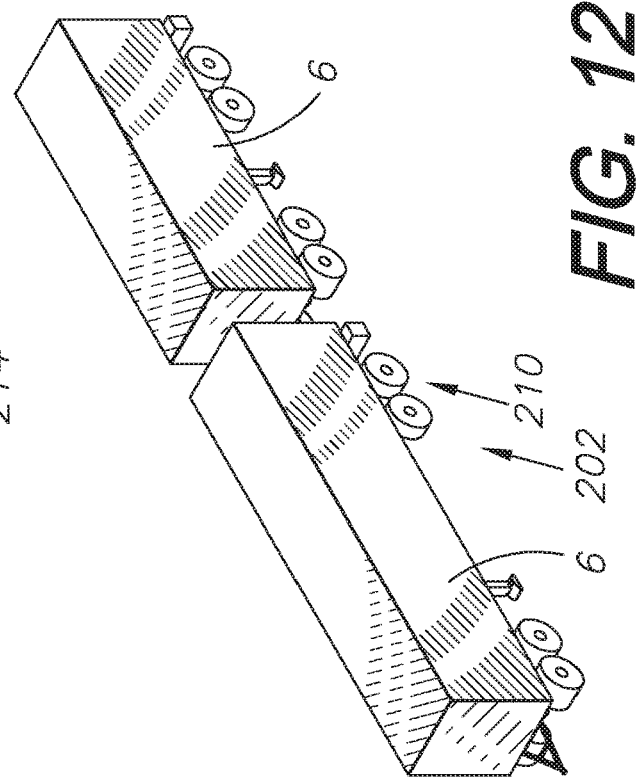
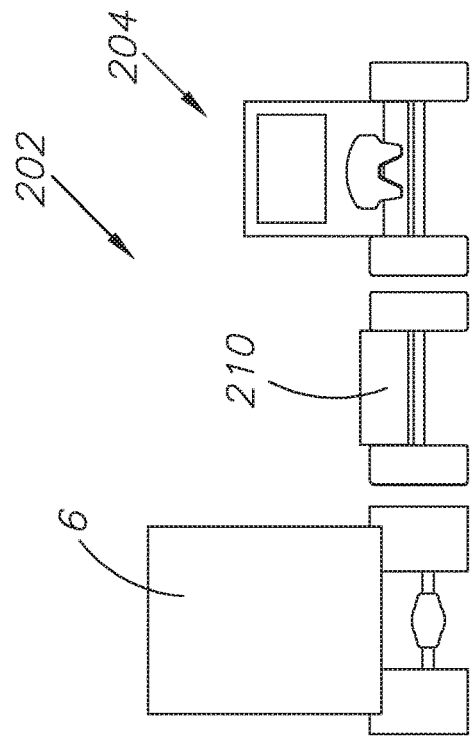

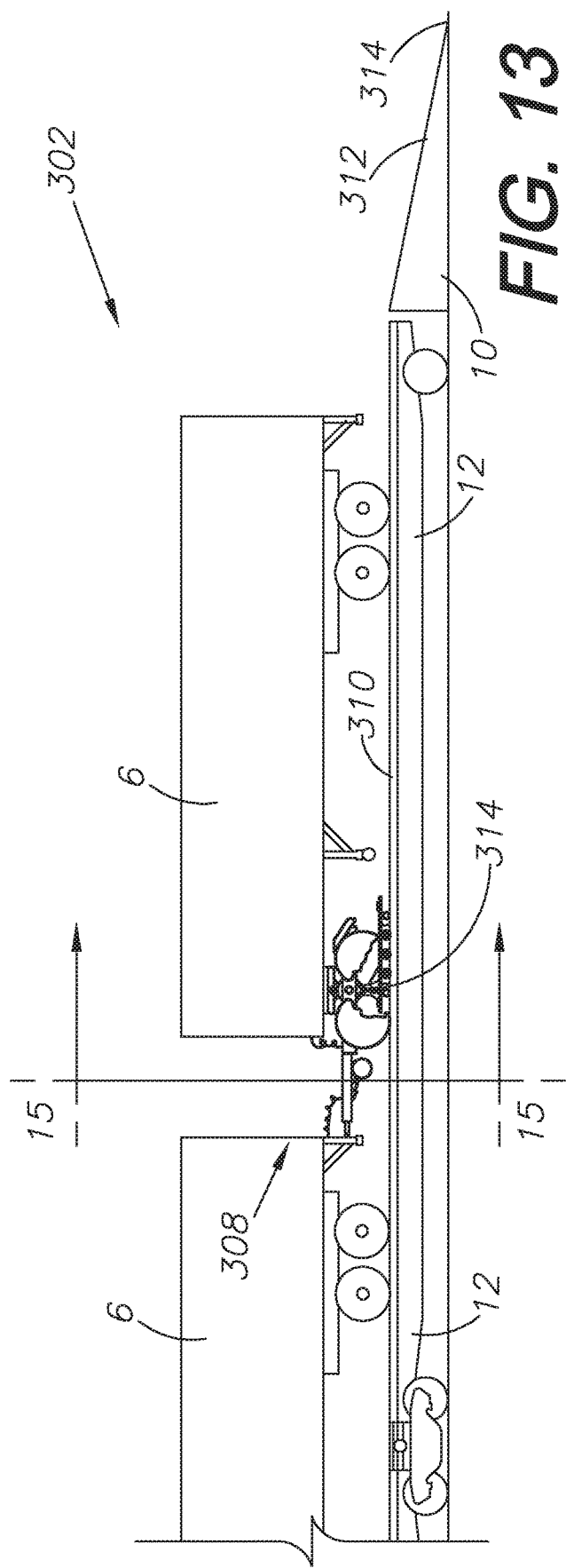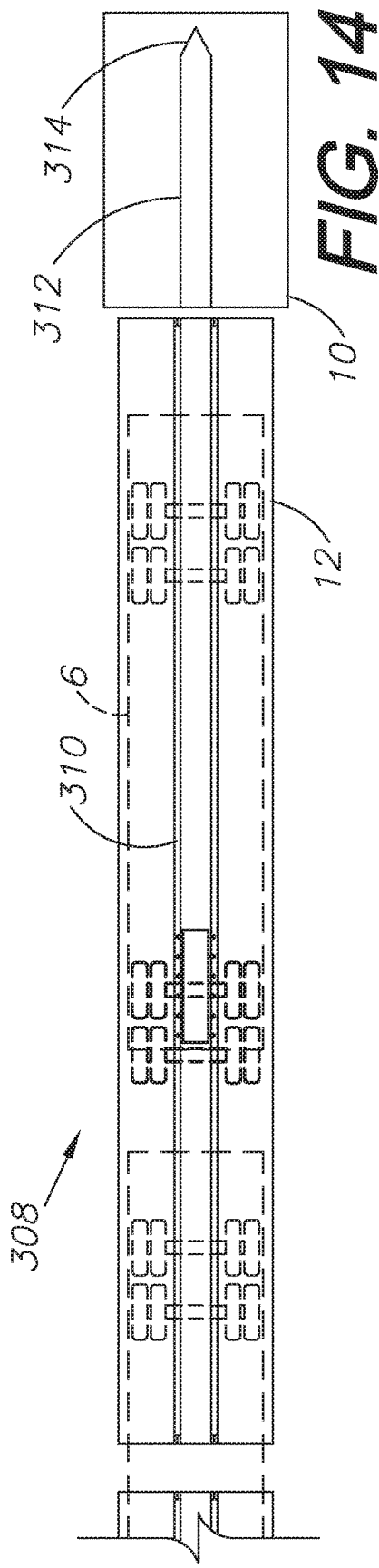

INTERMODAL TRANSPORTATION SYSTEM INCLUDING GUIDE RAILS AND AUTONOMOUS TRANSPORT DOLLIES

CROSS-REFERENCE TO RELATED APPLICATION

This application claims priority in U.S. Provisional Patent Application No. 62/482,265 Filed Apr. 6, 2017, and in U.S. Provisional Patent Application No. 62/559,350 Filed Sep. 15, 2017, which are incorporated herein by reference.

BACKGROUND OF THE INVENTION

1. Field of the Invention

The present invention relates generally to freight distribution systems, and more specifically to an intermodal transportation system utilizing skid loaders, trailer caddies, yard trucks, flat railcars, autonomous dollies, and local hybrid vehicle delivery of trailers and container-on-chassis trailers.

2. Description of the Related Art

Intermodal transportation of freight consists of the movement of individual freight containers utilizing different modes of transportation. The advantage of this method consists of increased efficiency in transportation of freight. Efficiencies are manifested in both the physical movement of the freight containers, and economical savings of bulk transportation of freight. As such, numerous approaches have been taken to maximize the physical and economic efficiencies of intermodal transportation. In particular, movement of freight utilizing a combination of railroad cars and tractor-trailers and container-on-chassis trailers suitable for travel on interstate highways has been the focus of much attention.

Two basic methods of moving freight by both railway and roadway consist of using either a semi-trailer and railroad flatcar combination, or a semi-trailer and bogie combination. A trailer and flatcar combination consists of a trailer having rear wheels on the back and on the front, a kingpin positioned piggyback-style on the top of a conventional flatcar. The trailer is positioned on the flatcar at a transition point utilizing either handling equipment (e.g., saddle or swing crane, or forklift) or driven onto the railroad car using a ramp and tractor. Once positioned on the flatcar, the kingpin of the trailer is typically secured to a coupling device having a fifth wheel for securely engaging the trailer to the flatcar. The rear of the trailer is supported by its rubber-tired wheels in this scenario. Multiple flatcars can be assembled into a train for efficient movement of freight. An advantage of using a flatcar for transporting a trailer permits the compression and tension forces encountered during train movement to be transferred through the flatcar. Moreover, many variations of trailers can be transported using this method of moving freight, and the conventional flatcar can be assembled into a train for transportation along conventional railway routes.

Currently, loading of flatcars with handling equipment requires decoupling of the trailer from the tractor, engagement and disengagement of the handling equipment during the transition period, and secure engagement of the trailer with the flatcar. The steps are completed in reverse for unloading the flatcar. This process is time consuming and requires expensive and complex handling equipment at each transition point. Moreover, the trailers and freight can become damaged during the transition due to collisions, dropping, and the shifting of freight. Loading trailers onto flatcars utilizing ramps positioned at the end or alongside the flatcar allow the tractor-trailer to drive up and onto the flatcar for deposition of the trailer. This method is accomplished by either driving the tractor-trailer onto the flatcar tractor first, or by backing the tractor-trailer onto the flatcar trailer first. Because each trailer is typically secured by its kingpin to the flatcar, trailers can only be loaded one at a time in a circus-loading fashion. Although driving the trailer onto the flatcar avoids the hazards of using handling equipment to move the trailer, the circus-loading process is time consuming resulting in decreased efficiency during physical movement of the freight.

A trailer and bogie combination consists of a modified semi-trailer adapted for engaging a specialized railway bogie. A trailer used in this approach differs from that employed above because instead of a conventional flatcar handling the rail compression and tension forces, a trailer with structural enhancements, and modified undercarriage manages the forces of the train. Here, assembly of a railroad car consists of a conventional tractor first engaging the frame of the aft portion of the trailer with a suitable railway bogie. Upon disengagement of the tractor from the trailer, the fore portion of the trailer is engaged with a suitable railway bogie by either its kingpin or the frame. Additional equipment necessary for assembly of this type of railroad car typically consists of ramps, or assist mechanisms built into the enhanced trailer. This method of moving freight is economically attractive because the elimination of a conventional flatcar from the railroad car assembly decreases the overall weight of the individual railroad car thereby decreasing the weight the locomotive needs to move. However, the disadvantages of this method of freight transportation over the conventional flatcar method relate to the weight of the trailer associated with its structural enhancements. Because such trailers typically have more steel in them to handle forces encountered during train movement, and sometimes have components enabling the trailer to travel on both the roadway or railway, the higher tare weight of the trailer limits the amount of weight the trailer is permitted to transport over a roadway. Moreover, such railroad cars typically require dedicated rail service because they are not compatible with other rail traffic due to their unique composition, and inability of the bogie couplings to manage usual train forces.

Heretofore there has not been available an inter-modal transportation system with the advantages and features of the present invention.

BRIEF SUMMARY OF THE INVENTION

The present invention generally provides an intermodal transportation system having lighter weight interconnected railcars adapted for transporting interconnected freight trailers where the freight trailers remain connected while being transported on the railcars. Individual trailers are dropped off at a railyard by over-the-road tractors and are then transported onto the railcars using various means as makes sense due to weather, location, and other factors.

A first embodiment has a skid loader acting as prime mover which hauls multiple trailers together in a connected orientation onto a set of flatbed railcars, after which the skid loader is offloaded from the flatbed railcars onto a flatbed truck with a tiltable bed. The trailers are moved together and connected to one another into a string using powered dollies or by other suitable means.

A second embodiment foregoes the powered dollies and instead uses a manually controlled trailer caddy, such as manufactured by DJ Products, Inc. of Little Falls, Minn. The trailers can be pulled into close proximity such that a front end of the pulled trailer is close to the rear end of a stationary trailer. The trailer caddy can then be used, with a push pad, to push the trailer to the stationary trailer and the two trailers can then be connected. The connection may include a pintle hook and a tow eye ring connection.

A third embodiment uses a common yard truck along with a front-end boom with pintle hook connections to tow a first trailer to a second trailer and to connect the two using a pintle hook and tow eye connection. The boom has a titltable upper arm which can be raised or lowered as needed to connect a non-motorized dolly to the king pin of the first trailer using a fifth wheel on the dolly. The tiltable boom allows the yard truck to drive parallel to the first trailer as the first trailer is moved behind and connects with the second trailer. The boom allows the connection to be lowered into position.

A fourth embodiment incorporates guide rails along a loading ramp for help in loading and unloading vehicles and transport containers onto railcars. The ramp portion tapers to a point. As vehicles drive over the ramp, the angle of the guide will direct the vehicle's wheels to one side or the other, thereby preventing misalignment of the vehicle along the ramp and onto the railcars, preventing accidental driving off of the ramp or car. Each railcar in turn includes a section of a guide rail down the center of the car and lines up with the guide from the ramp. These guide rails may be channels into which trollies or dollies will drive along and fit into, thereby locking them into place during transport by rail.

A fifth embodiment includes several powered converter dollies, such as those disclosed in U.S. Pat. Nos. 8,534,694 to and 8,365,674, both assigned to Twenty-first Century Transport Systems, Inc. of Fort Scott, Kans., which are incorporated herein by reference. Here, the dollies are autonomous and each dolly is used to move and guide a single transport container about a rail yard, onto, and off of rail cars, or wherever desired. A central computer controls the dollies using wireless communication, such as a Wi-Fi network, cellular communications networks such as LTE, 3G, or 4G networks, or other suitable wireless communication means. The central computer organizes and instructs the dollies to act autonomously to avoid wrecks, slowdowns, and other delays caused by directing human operators and drivers. The powered converter dollies can also be operated individually using a separate controller or smart phone software application, and be equipped to operate in platooning mode, e.g. master and slave orientation.

These embodiments could be used in combination or individually as required.

BRIEF DESCRIPTION OF THE DRAWINGS

The drawings constitute a part of this specification and include exemplary embodiments of the present invention illustrating various objects and features thereof.

FIG. 10 is a side elevational view of a yard truck and dolly used in the embodiment thereof.

FIG. 11 is a rear elevational view thereof.

FIG. 12 is a three-dimensional view thereof.

FIG. 13 is a side elevational view of another alternative embodiment of the present invention incorporating guide rails into a ramp and railcars for loading transport trailers and containers.

FIG. 14 is a top plan view thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. First Embodiment Intermodal Transport System 2

Figure 1:
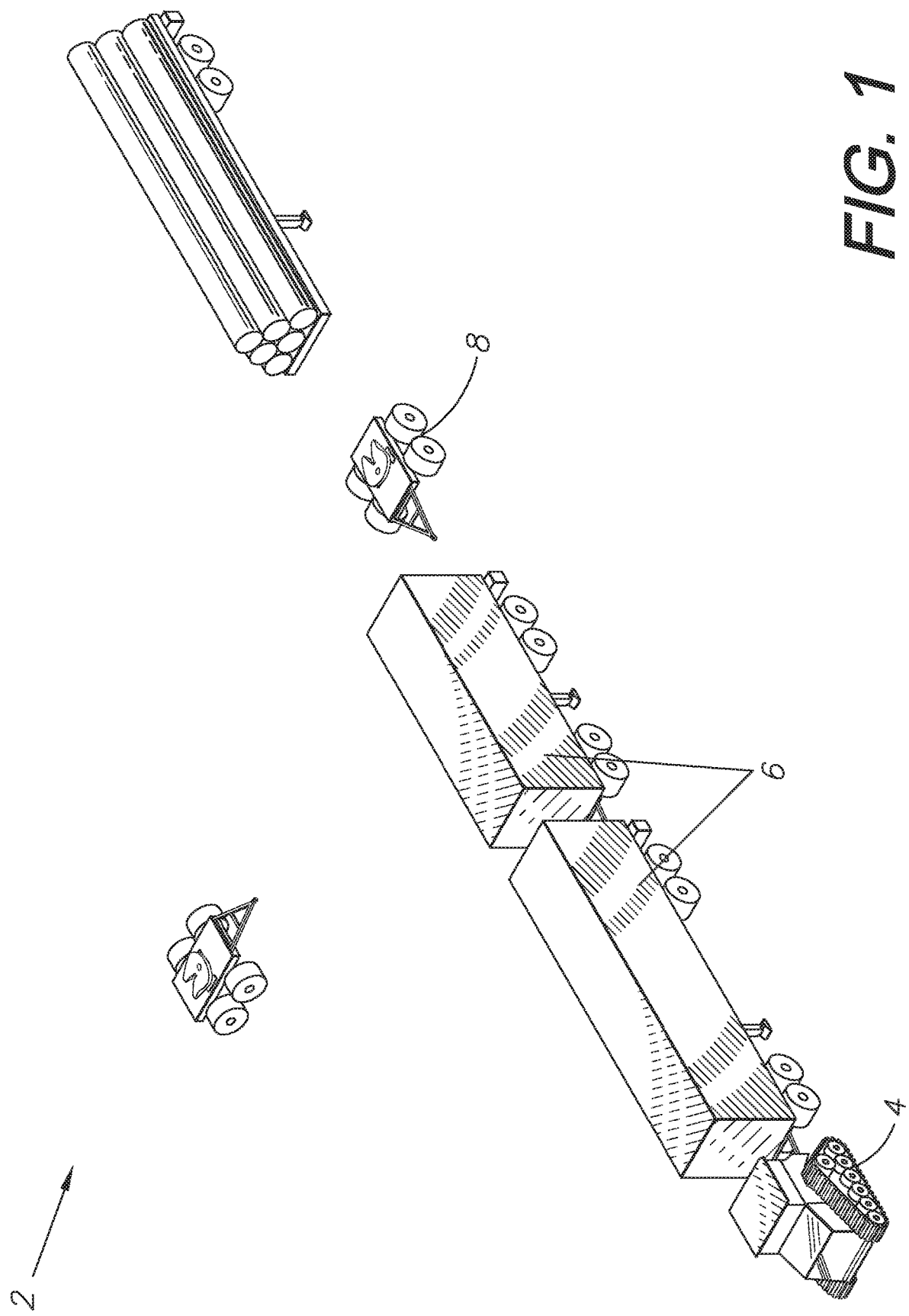
FIG. 1 is a three-dimensional rendering of a first step of practicing a first embodiment of the present invention.

FIGS. 1-7 show seven steps of an intermodal transport system 2 where several trailers 6 are connected using powered dollies 8 and loaded onto a series of flatbed rail cars 12 using a skid loader 4 or similar vehicle as a prime mover. FIG. 1 shows a trailer being added to a string of trailers hooked up to a skid loader, the trailers are moved into position using powered dollies which connect to the kingpin of the trailer they are moving and to the rear end of the next trailer in the string.

Figure 2:
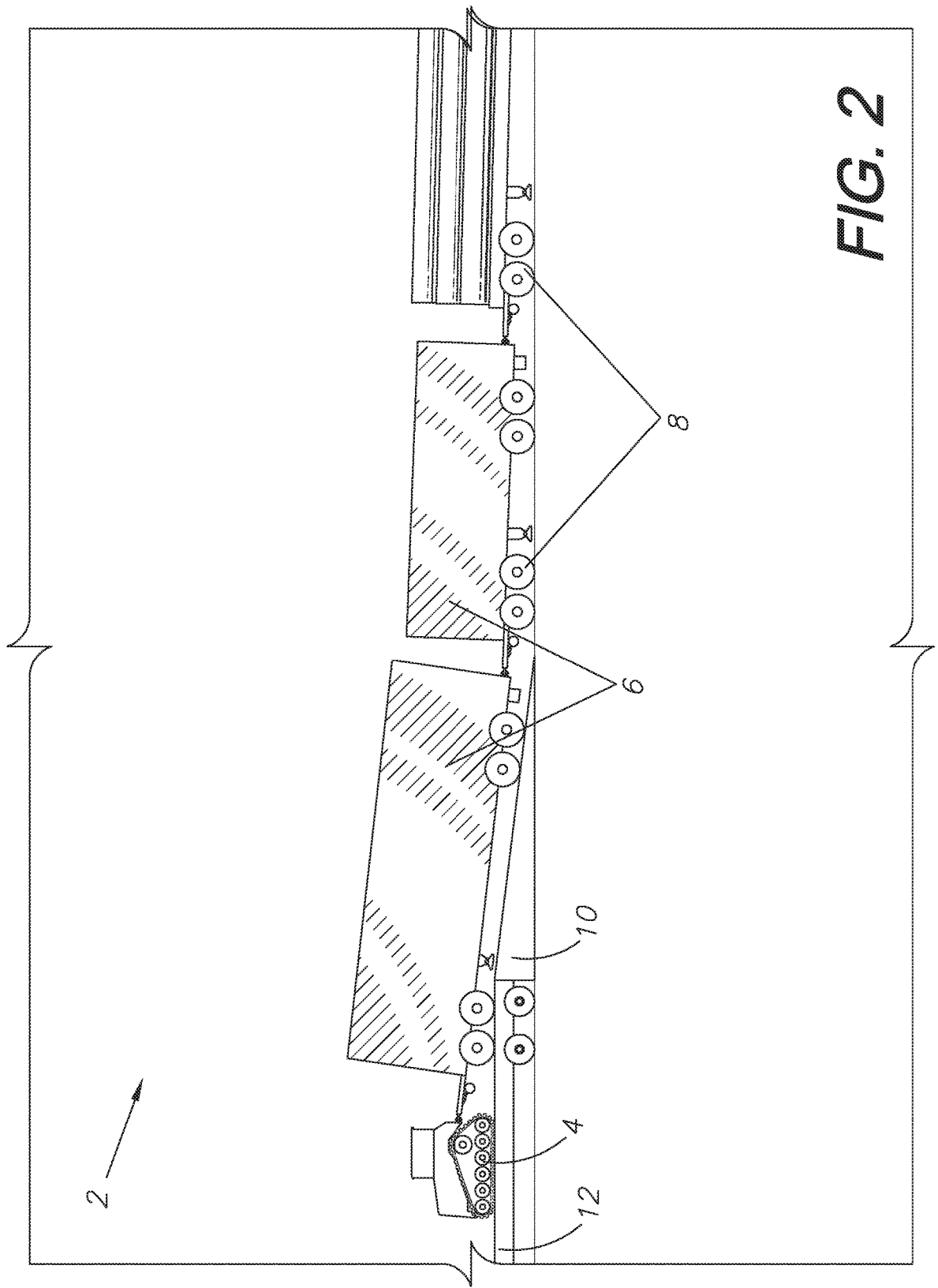
FIG. 2 is a three-dimensional rendering of a second step of practicing a first embodiment of the present invention.
Figure 3:
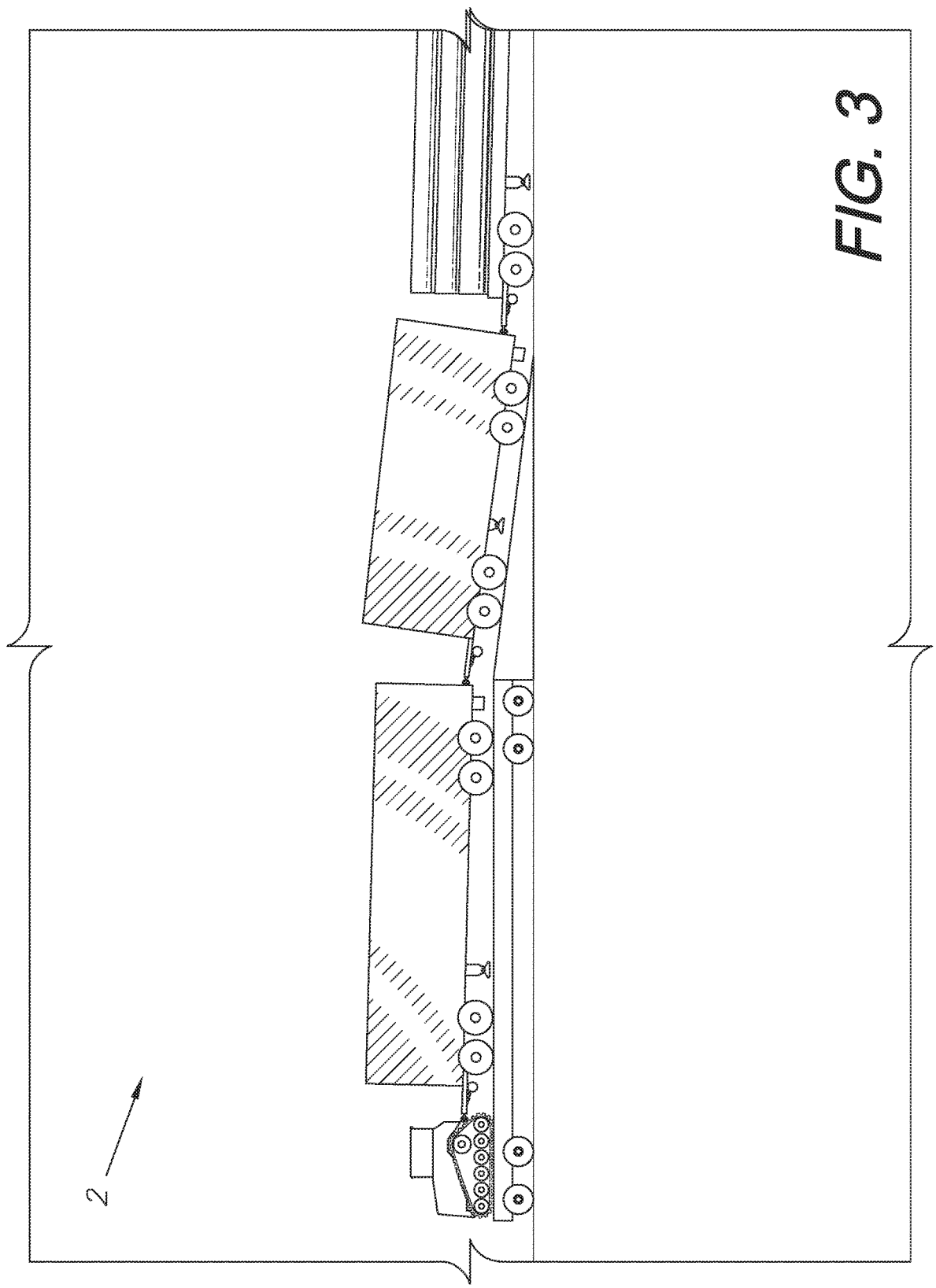
FIG. 3 is a three-dimensional rendering of a third step of practicing a first embodiment of the present invention.
Figure 4:
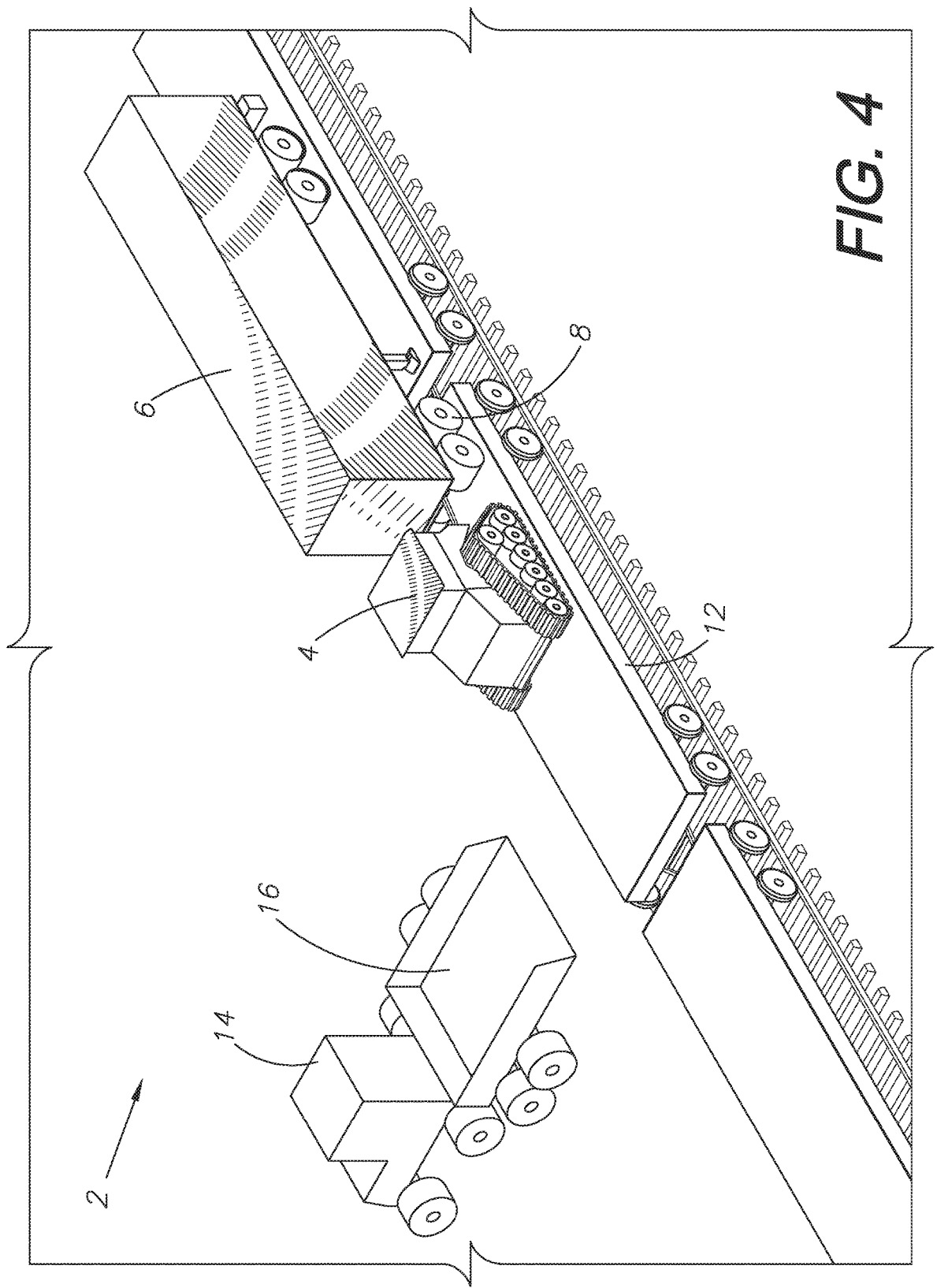
FIG. 4 is a three-dimensional rendering of a fourth step of practicing a first embodiment of the present invention.
Figure 5:
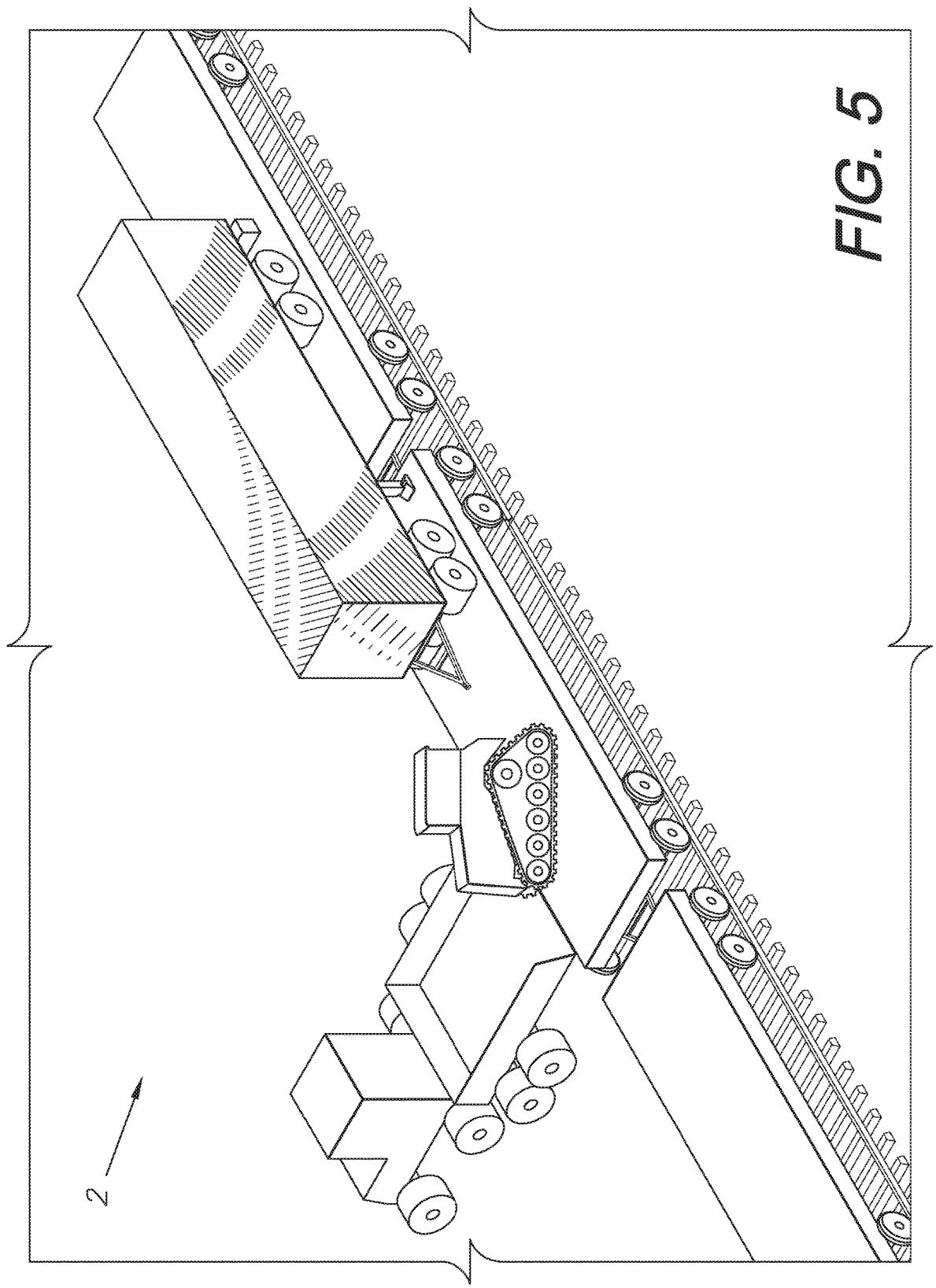
FIG. 5 is a three-dimensional rendering of a fifth step of practicing a first embodiment of the present invention.

FIG. 2 shows the skid loader hauling the string of trailers up a ramp 10 onto a series of flatbed rail cars 12. FIG. 3 shows a continuation of this process. FIG. 4 shows the skid loader moving the trailers into a final position on the railcars. A flatbed truck 14 with a tiltable trailer 16 is backed up to the railcars. FIG. 5 shows the skid loader decoupled from the trailer string and moving onto the flatbed truck.

Figure 6:
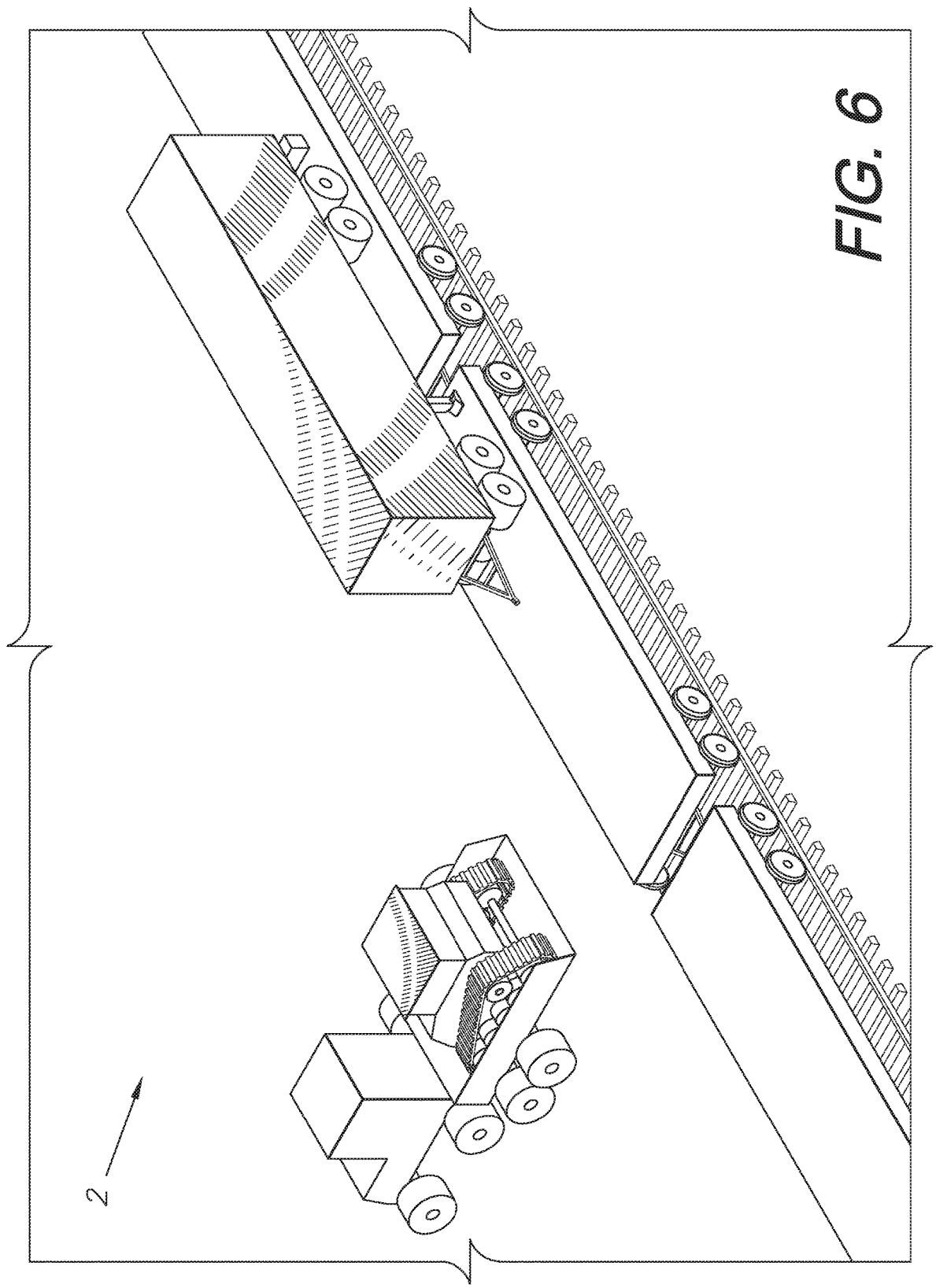
FIG. 6 is a three-dimensional rendering of a sixth step of practicing a first embodiment of the present invention.
Figure 7:
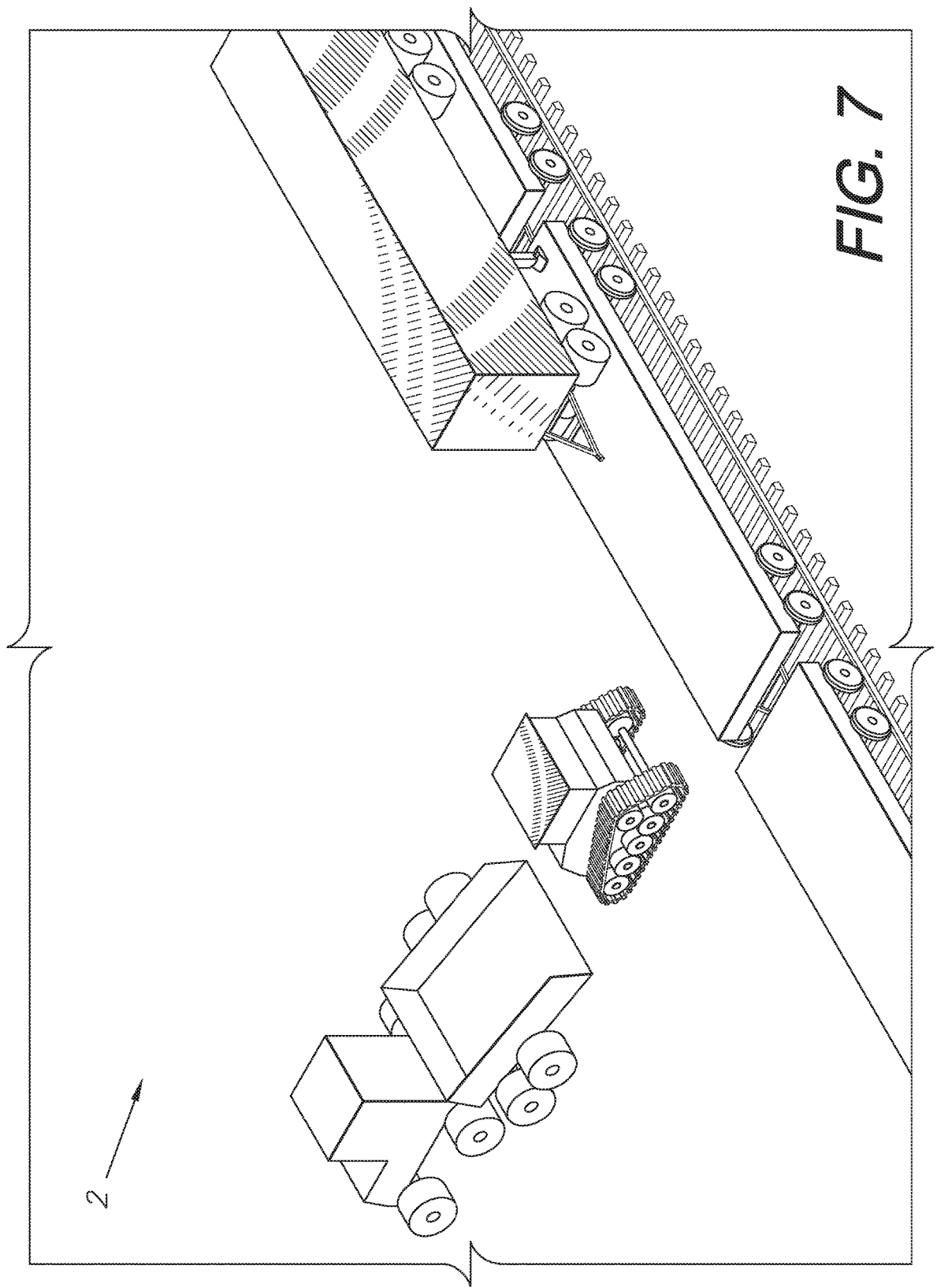
FIG. 7 is a three-dimensional rendering of a seventh step of practicing a first embodiment of the present invention.

FIG. 6 shows the flatbed truck moving the skid loader away from the rail cars. FIG. 7 shows the skid loader being offloaded using the tiltable trailer.

Skid loaders are somewhat common pieces of equipment about a railyard, so using one to act as a prime mover and then safely offloading the skid loader using a flatbed truck solves several logistic issues. The skid loader can also be loaded onto the railcar using a reverse set of steps, allowing the skid loader to unload the trailers from the rail cars.

III. Second Embodiment Intermodal Transport System 102

Figure 8:
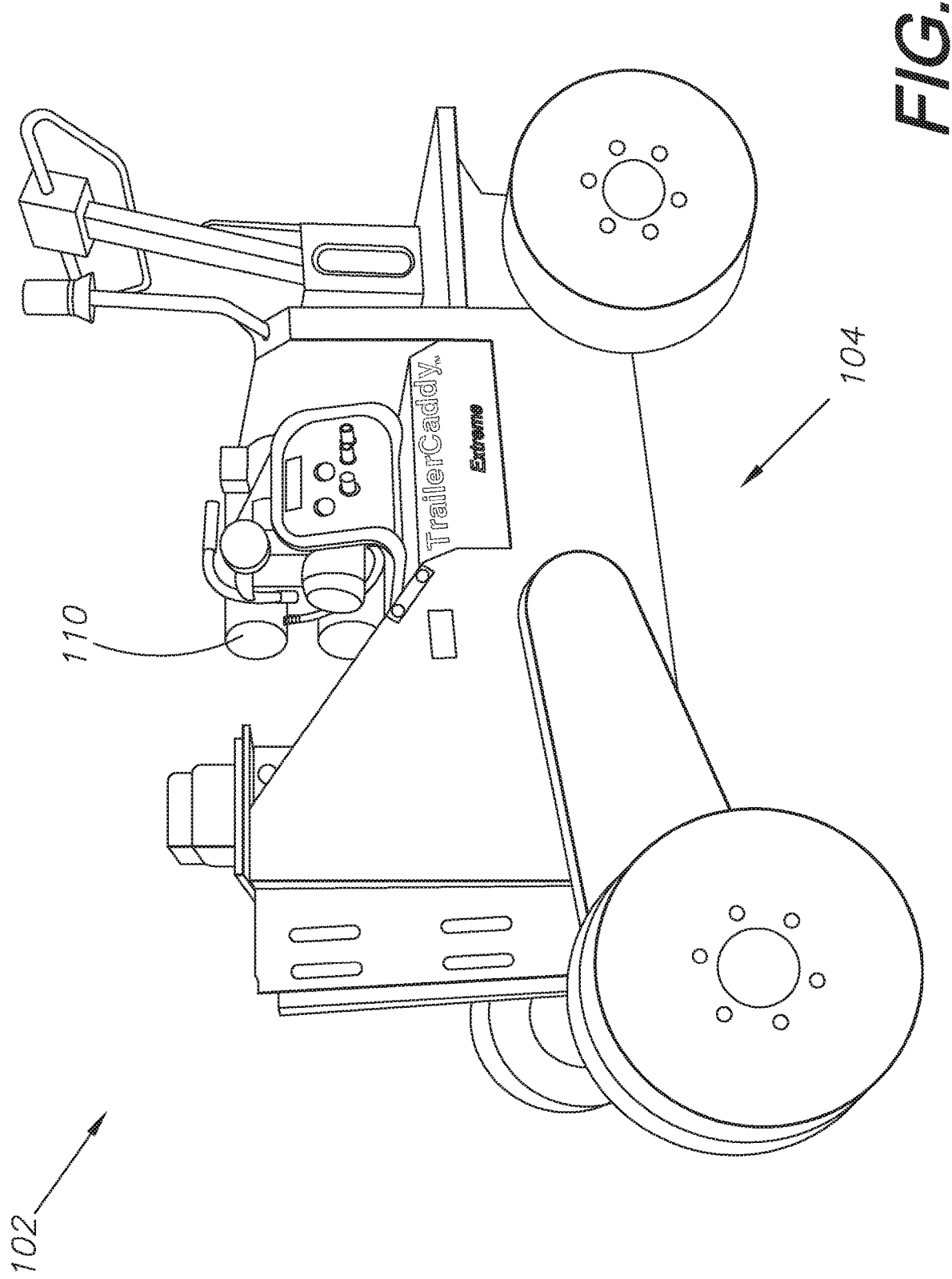
FIG. 8 is a photograph of a trailer caddy which can be used with an alternative embodiment of the present invention.

FIG. 8 shows a trailer caddy device 104 which provides a manually controlled machine capable of being hooked up to a trailer 6. The trailer caddy 104 includes an air compressor 110 which can control the brakes and other features of the trailer, allowing full control over the trailer. The trailer will likely require its landing gear to be at least slightly raised using this device.

The trailer caddy 104 can be hooked to a trailer's king pin using a fifth wheel connection. The trailer caddy can then be used to back a first trailer up to a second trailer. The trailer caddy can then be disconnected, moved to the opposite end of the first trailer, and then, in conjunction with a push pad, be used to push the first trailer into connection with the second trailer. The connection could be any sort of feasible connection, such as a pintle hook on the first trailer and a tow eye ring on the second trailer being connected together. This removes the need for powered dollies 8 when connecting and loading trailers as discussed in the first embodiment above.

IV. Third Embodiment Intermodal Transport System 202

Figure 9:
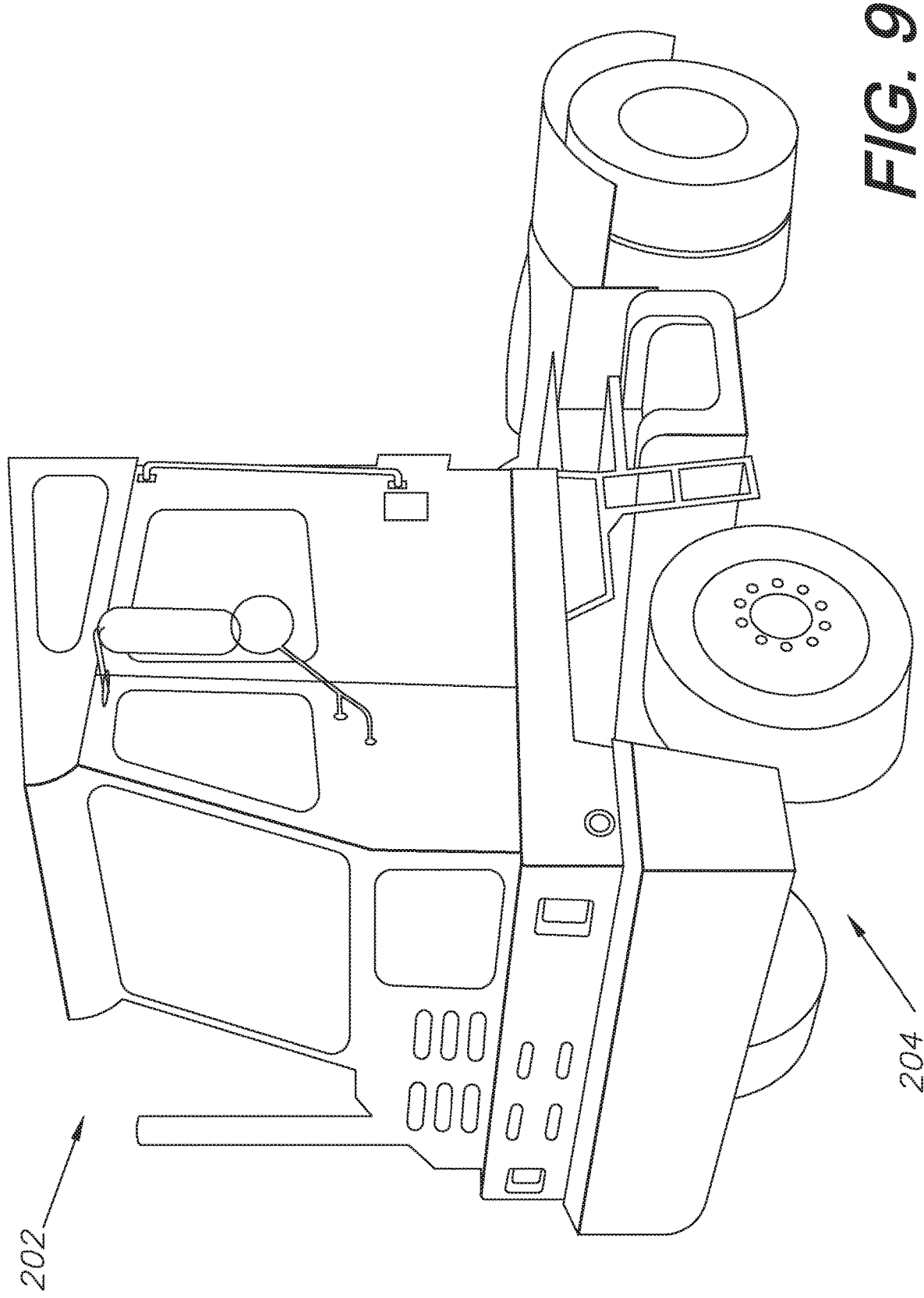
FIG. 9 is a photograph of a yard truck which can be used with another alternative embodiment of the present invention.

FIG. 9 shows a traditional yard truck 204 which is common in rail yards. These yard trucks can be used to move trailers 6 about the rail yard. FIG. 10 shows how a yard truck 204 could be front-loaded with a dolly 210 connected to a tiltable boom 212 which can raise and lower the dolly such that the dolly can connect to the kingpin of a first trailer. The truck, as shown in FIG. 11, can then move to the side of the trailer and pull the first trailer up to the rear end of a second trailer using the boom 212. The boom can then be used to connect the dolly to a pintle hook 214, tow eye, or other connection on the rear of the second trailer as diagrammed in FIG. 12. The yard truck and boom can then disconnect and move other trailers into a string which can be loaded using a method such as that disclosed above.

V. Fourth Embodiment Intermodal Transport System 302

Figure 15:
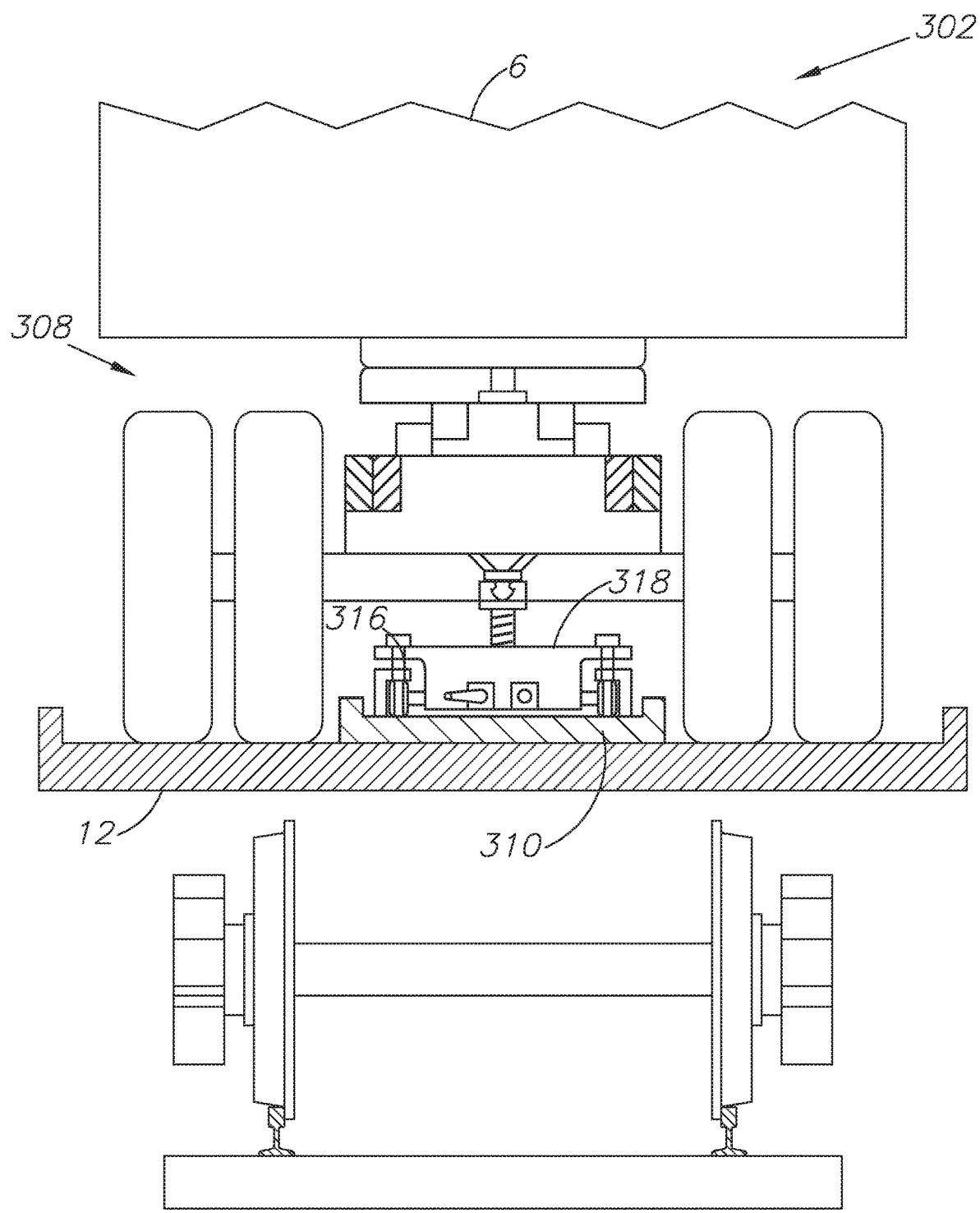
FIG. 15 is a front sectional view thereof taken from the line of FIG. 13.

FIGS. 13-15 show an alternative embodiment intermodal transport system 302 for loading transport trailers 6 onto a railcar 12 using dollies 308, rail yard trucks 204, skid loaders 4, or other trolley means is guided onto a ramp and onto railcars using a guide channel 310 or guide rails. This prevents the trollies and the transport trailers from accidentally driving off of the railcars or ramp.

FIG. 15 shows a first version where the trolley 308 (e.g. the dolly, truck, or other prime moving loading vehicle) is contained within a channel 310 functioning as the guide rail. A similar guide 312 with a starting point 314 could be used on the removable ramp 10 to allow the guide wheels 316 connected to the guide train 318 of the dolly 3018 to seamlessly guide into the channel 310. This is a safety and efficiency system for preventing accidents and accelerating the rate at which transport trailers can be loaded onto railcars

VI. Fifth Embodiment Intermodal Transport System 402

Figure 16:
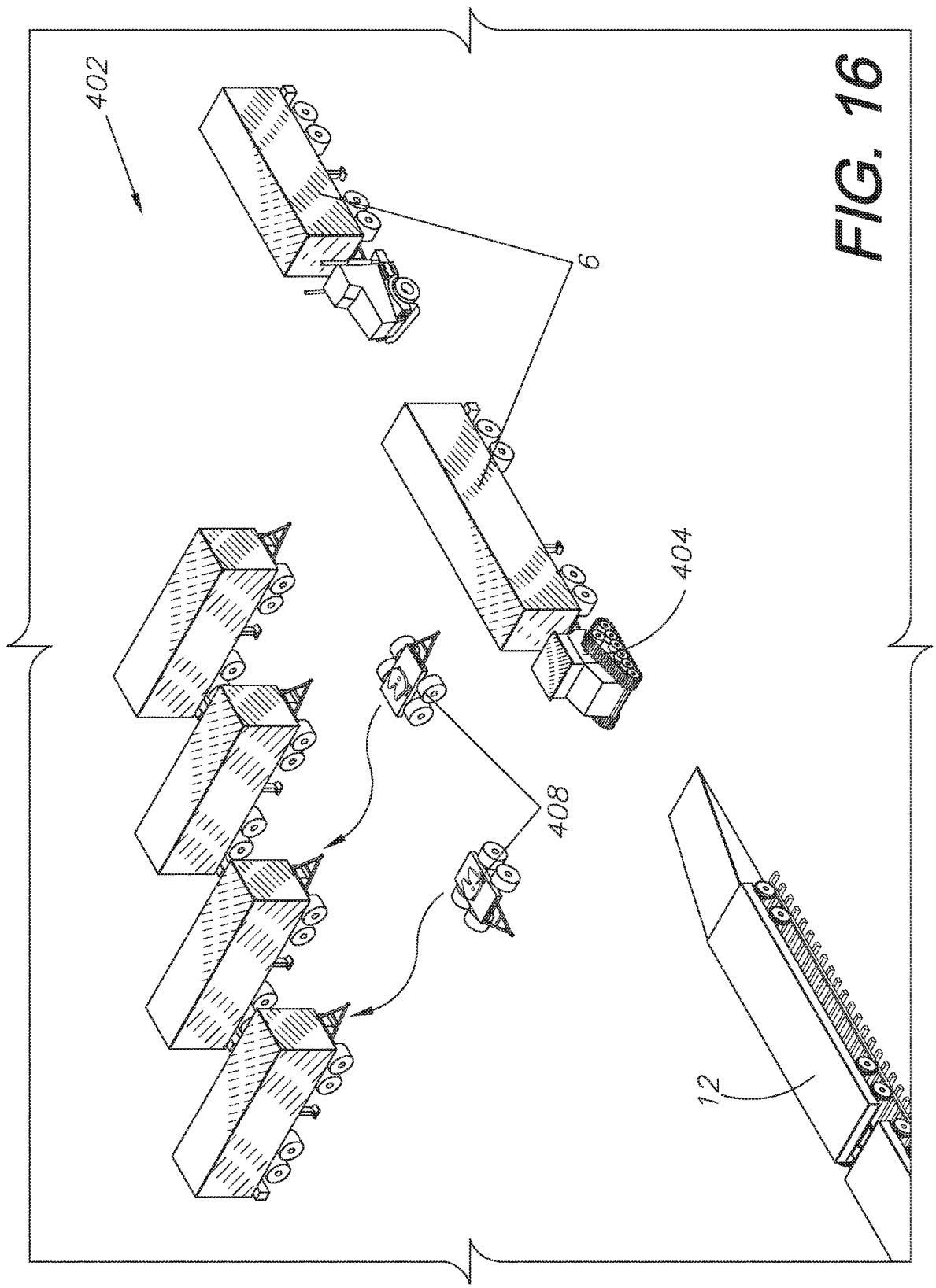
FIG. 16 is a three-dimensional rendering of yet another alternative embodiment of the present invention showing several autonomous dollies traveling to a respective number of transport container trailers for transport to a railcar.
Figure 17:
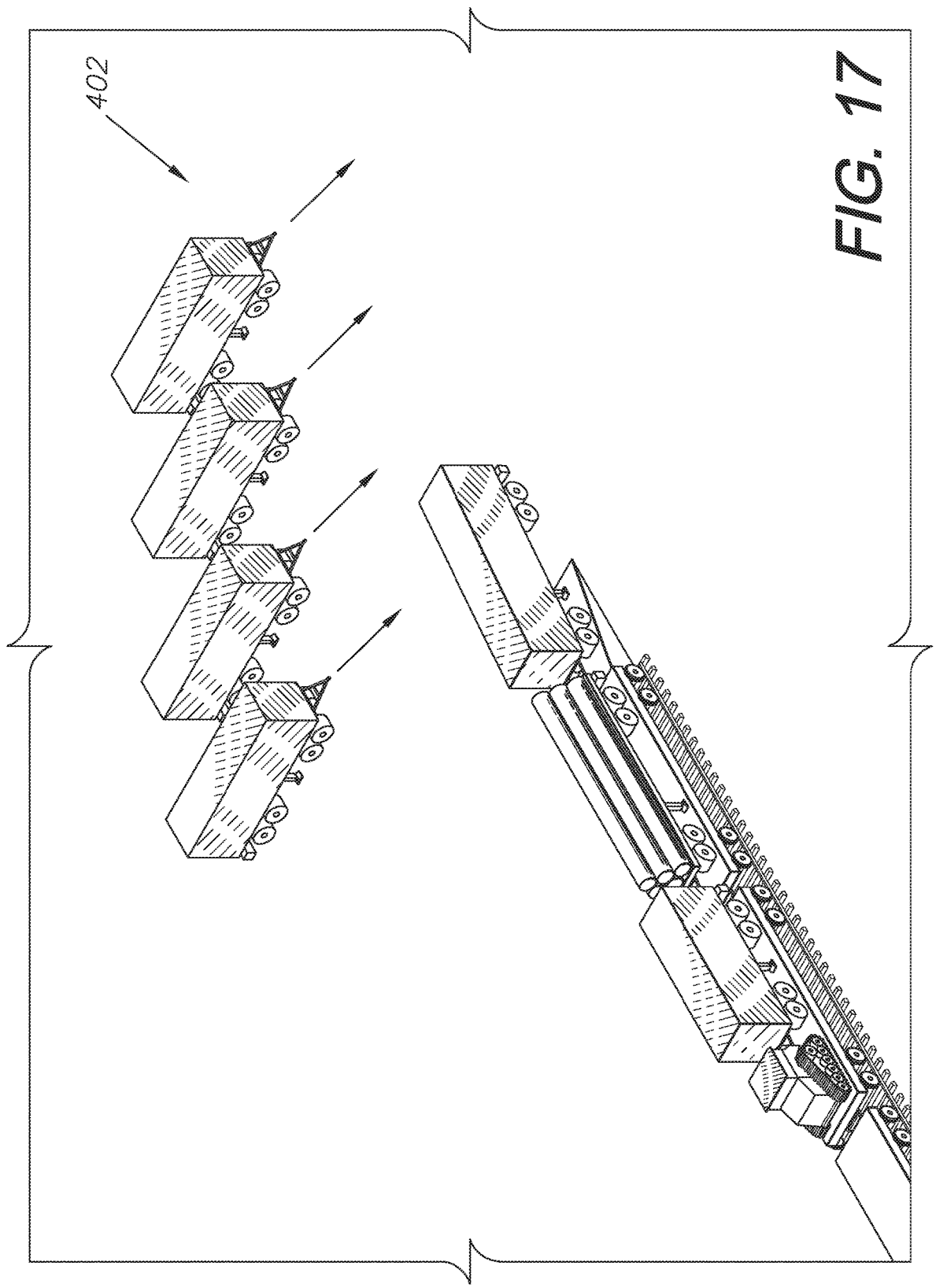
FIG. 17 is a three-dimensional rendering thereof, showing a second step of loading transport trailers on a railcar using autonomous dollies.
Figure 18:
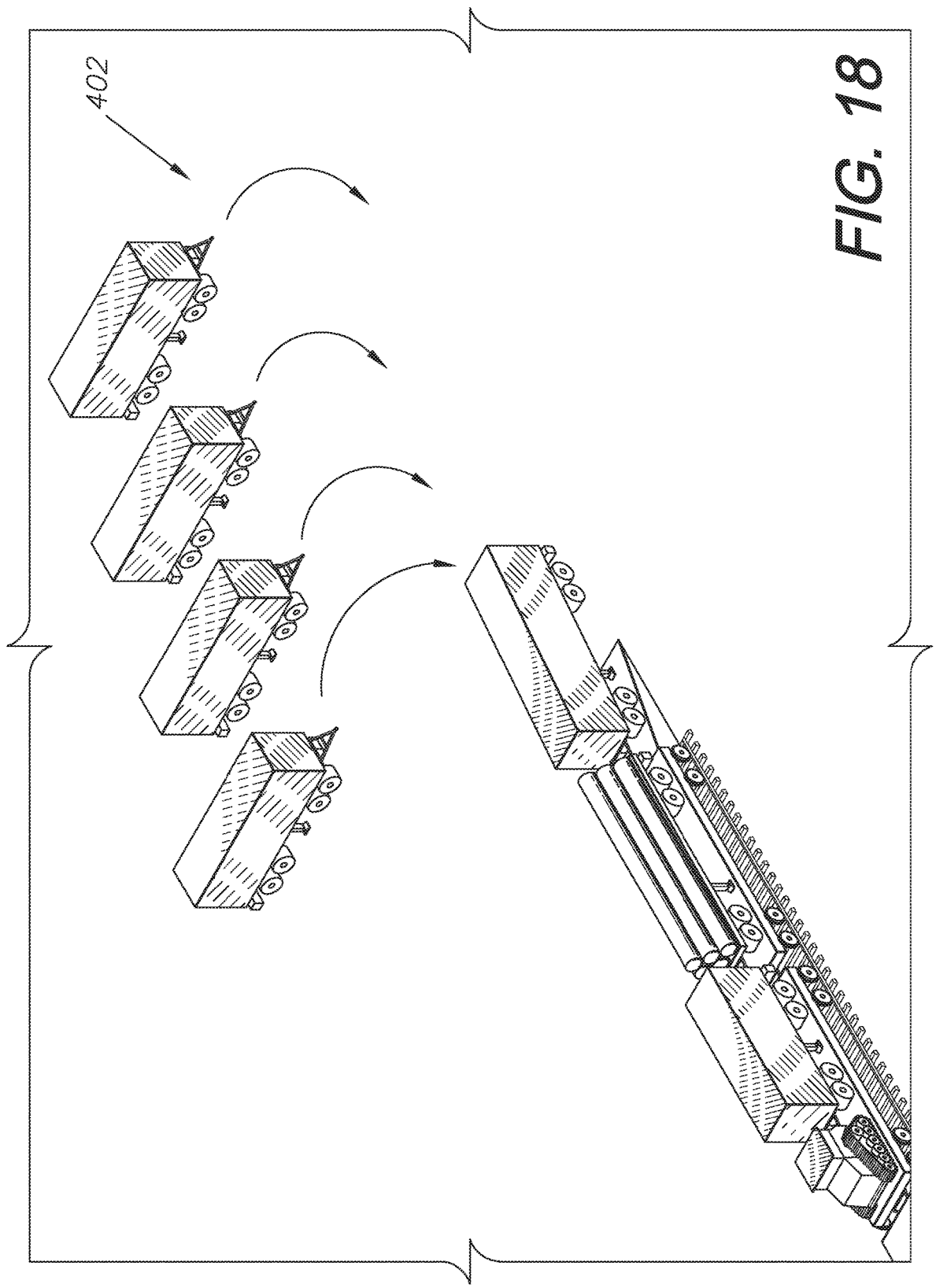
FIG. 18 is a three-dimensional rendering thereof, showing a third step thereof.
Figure 19:
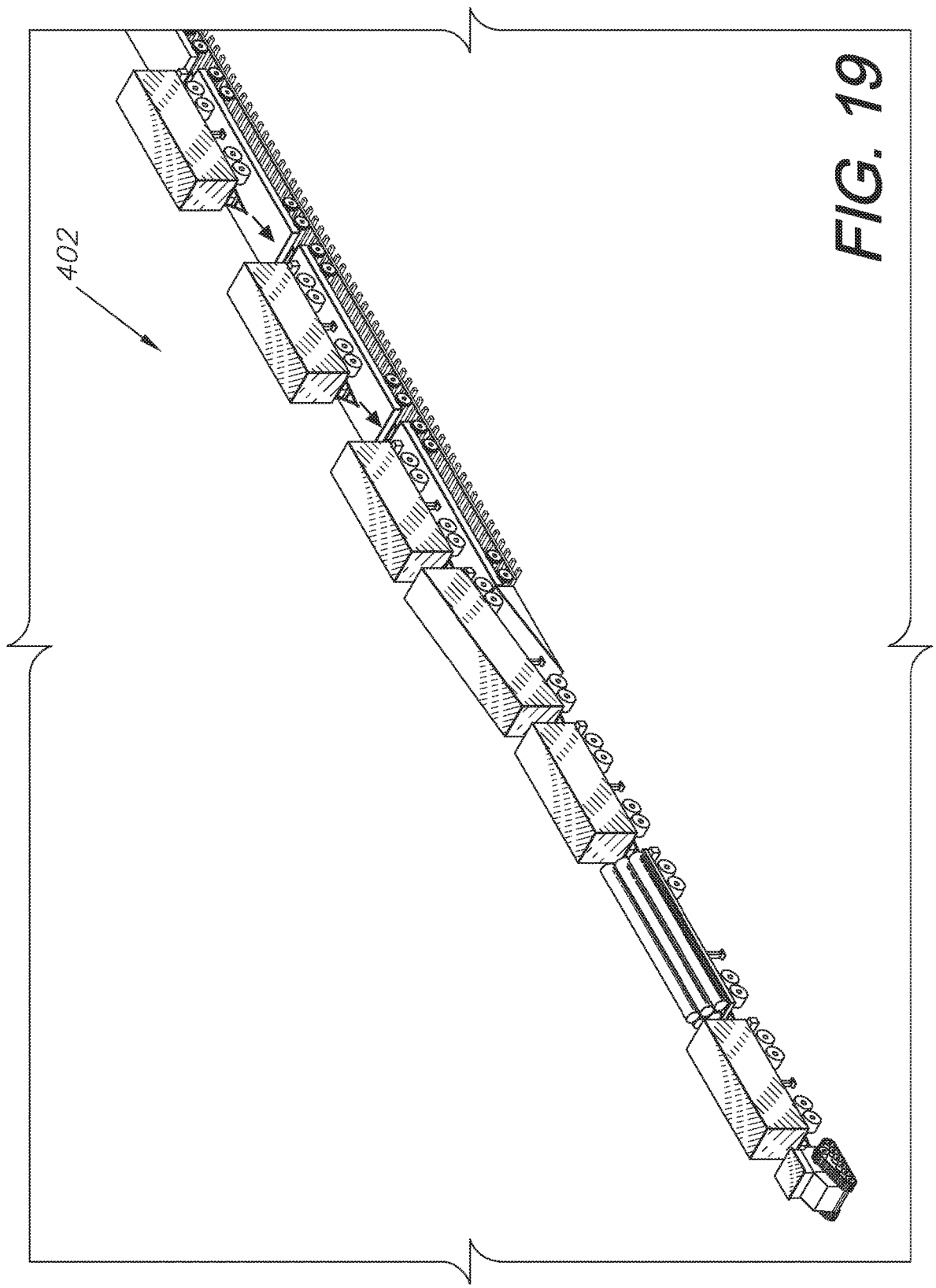
FIG. 19 is a three-dimensional rendering thereof, showing a fourth step thereof.
Figure 20:
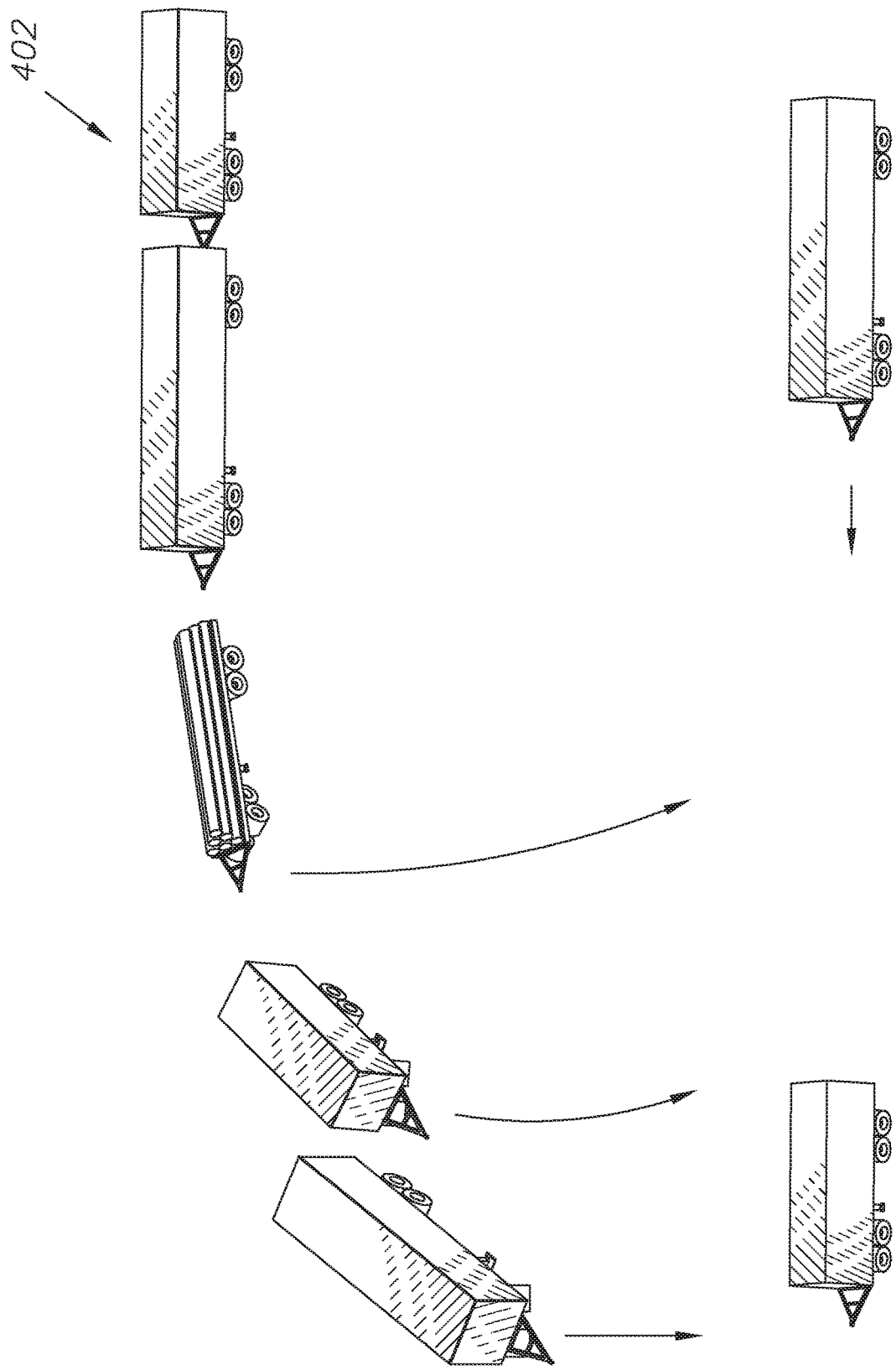
FIG. 20 is a three-dimensional rendering thereof, showing the autonomous dollies unloading transport trailers and transporting them to a storage yard.
Figure 21:
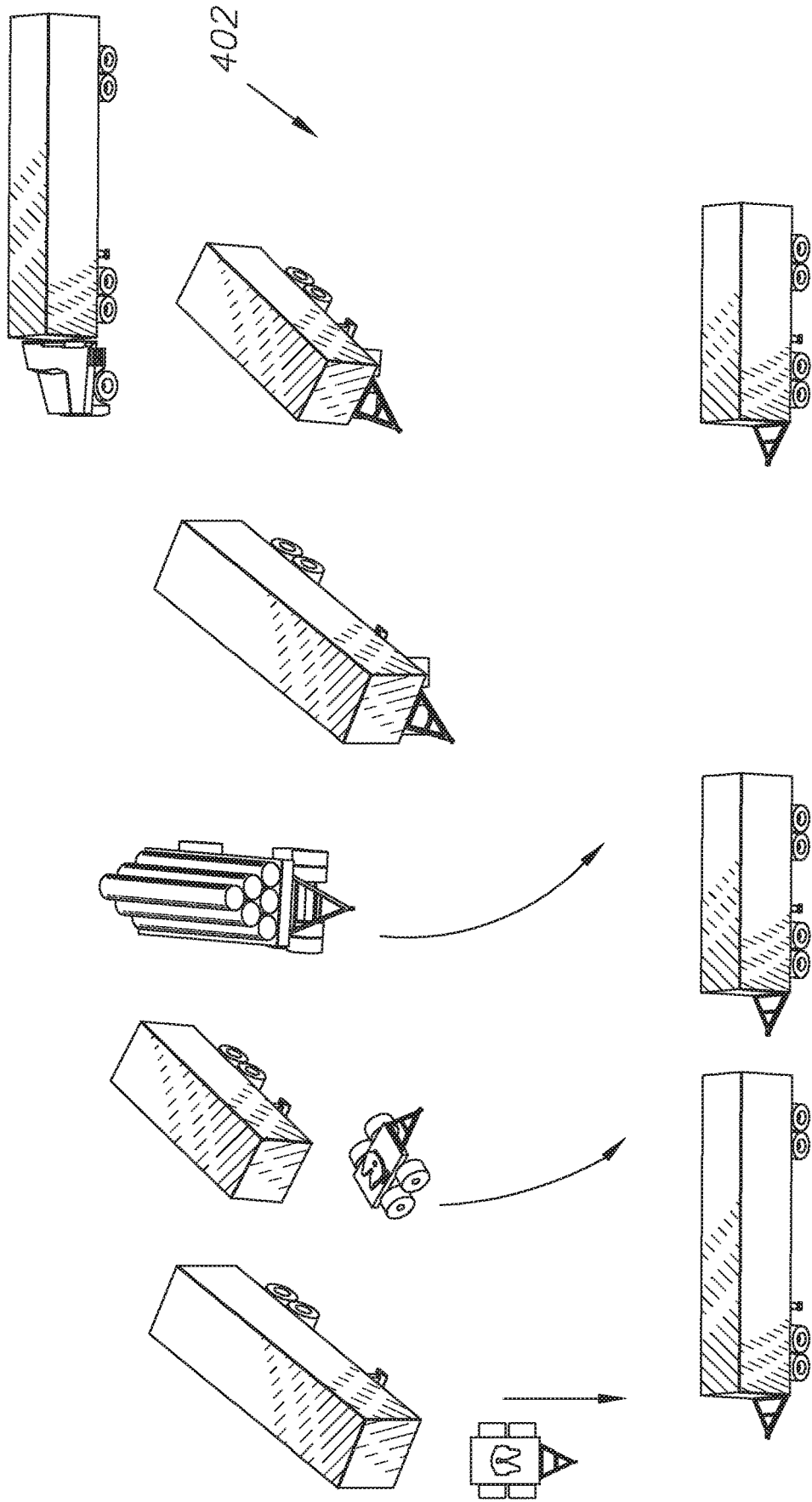
FIG. 21 is a three-dimensional rendering thereof, showing a second step of unloading.
Figure 22:
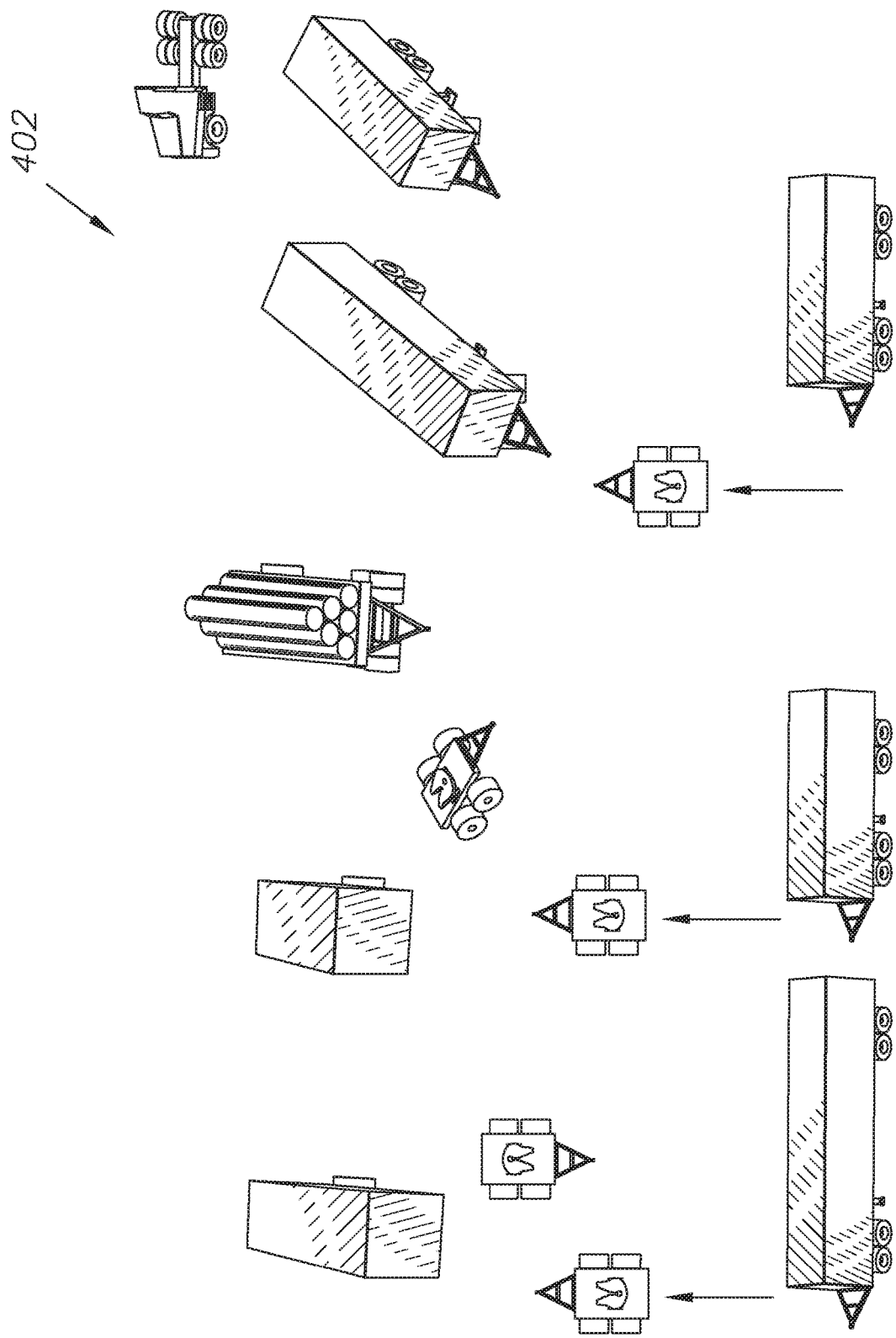
FIG. 22 is a three-dimensional rendering thereof, showing a third step of unloading.

FIGS. 16-18 show an autonomous dolly loading and unloading system for loading transport trailers onto a series of railcars. As shown in FIGS. 5-8, the dollies 408 each go out and receive a single transport trailer 6 and move them onto the railcars 12 individually. FIGS. 19-22 show the end of the transport, where the trailers are then individually unloaded using the dollies. A prime mover 404 can also be used to drive a train of trailers along the rail cars as shown in FIG. 17 once the dollies 408 connect the trailers up.

Figure 23:
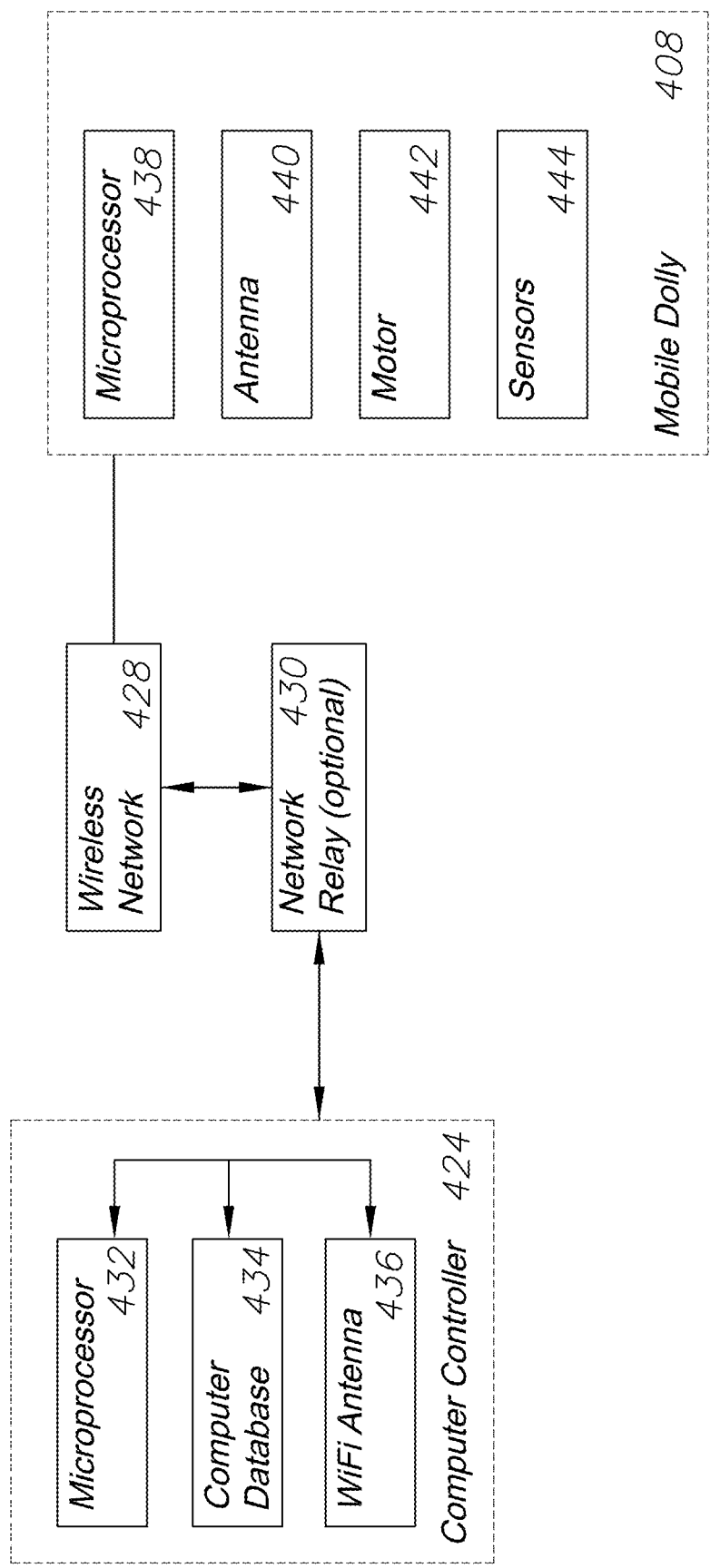
FIG. 23 is a diagrammatic representation showing an embodiment of the present invention.

As outlined in FIG. 23, a central computer 424 controls the autonomous dollies 408 remotely, sending commands over a wireless communications network 428 to the dollies. This allows for automatic and individualized control of each dolly, preventing human error caused by directing human-driven vehicles and human-controlled dollies, trolleys, and trucks when loading transport trailers onto a railcar. Each dolly would include a microprocessor 438, antenna 440 for receiving instructions wirelessly, a motor 442 for driving the dollies, and sensors 444 for detecting obstructions, trailers, and each other dolly in the array.

The central computer similarly has a microprocessor 432 for instructing the dollies, a database 434 for storing data such as dolly information and instructions, and an antenna 436 for sending instructions wirelessly to the dollies. Network Relays 430 may also be placed throughout the yard if needed to expand the wireless network.

Alternatively, a first truck or dolly could be controlled by an operator and act as a master dolly, and a string of other autonomous dollies could follow along as "slave" dollies, functionally acting in a platooning mode where whatever turns or directional changes the master dolly takes (e.g. to avoid a pot hole on the road), the slave dollies follow.

The dollies could be controlled individually using a controller or a smart computing device software application, such as a smart phone application with graphical user interface.

It is to be understood that while certain embodiments and/or aspects of the invention have been shown and

Having thus described the invention, what is claimed as new and desired to be secured by Letters Patent is:

1. An intermodal transportation system for moving of freight, the system comprising:
    a plurality of individual freight trailers, each said freight trailer including a kingpin connector;
    a railcar assembly comprised of a plurality of interconnected railcars adapted for transporting said interconnected freight trailers;
    a locomotive or other means adapted to transport said railcars across railway tracks;
    a plurality of self-powered dollies adapted for engaging the kingpin connectors of said freight trailers;
    a moveable ramp adapted for loading said interconnected freight trailers onto said interconnected railcars;
    a prime mover configured for connecting to a lead one of said freight trailers, said prime mover further configured to pull a plurality of said freight trailers up said moveable ramp onto said interconnected railcars;
    each of said plurality of self-powered dollies comprising a microprocessor, communications antenna, motor, and sensor array;
    a central controller computer comprising a microprocessor, database, and antenna;
    a wireless communications network;
    said central controller computer configured for wirelessly sending control commands through said wireless communications network from said controller computer antenna to each of said self-powered dollies antennas;
    said control commands configured to instruct each of said plurality of self-powered dollies to be moved using each respective motor; and
    wherein said sensor array of each of said plurality of self-powered dollies is configured to provide additional control commands to each respective self-powered dolly.

2. The intermodal transportation system of claim 1, further comprising:
    a guide channel located on each of said plurality of freight trailers;
    a guide connected to each of said plurality of self-powered dollies, said guide comprising wheels configured for engaging with said guide channel; and
    wherein said guide channel and guide are configured to retain said freight trailers upon said railcars.

3. The intermodal transportation system of claim 2, further comprising:
    said moveable ramp comprising a guide configured for guiding said guide of each of said plurality of self-powered dollies into said guide channel.

4. The intermodal transportation system of claim 1, further comprising:
    a flatbed truck having a tiltable ramp configured for being moved adjacent to one of said freight trailers;
    said prime mover configured for disengaging from said lead one of said freight trailers; and
    wherein said prime mover is further configured for driving off of said one of said freight trailers onto said tiltable ramp of said flatbed truck.

5. The intermodal transportation system of claim 1, wherein said prime mover comprises a trailer caddy.

6. The intermodal transportation system of claim 1, wherein said prime mover comprises a yard truck.

* * * * *